United States Patent
Chiang et al.

(10) Patent No.: US 8,570,141 B2
(45) Date of Patent: Oct. 29, 2013

(54) METHOD AND APPARATUS FOR MONITORING AND CONTROLLING A HOUSEHOLD APPLIANCE STANDBY STATE

(75) Inventors: Yi-Lin Chiang, Kaohsiung (TW); Shun-Chieh Lin, Tainan (TW); Ya-Hui Li, Yunlin County (TW); Huan-Wen Tsai, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 325 days.

(21) Appl. No.: 13/115,046

(22) Filed: May 24, 2011

(65) Prior Publication Data

US 2012/0161922 A1 Jun. 28, 2012

(30) Foreign Application Priority Data

Dec. 28, 2010 (TW) .............................. 99146306 A

(51) Int. Cl.
G05B 23/02 (2006.01)
G08B 21/00 (2006.01)
H01H 31/10 (2006.01)
G06G 7/00 (2006.01)
G06F 7/58 (2006.01)

(52) U.S. Cl.
USPC ............ 340/3.1; 340/656; 340/657; 307/115; 709/208; 709/224; 709/250

(58) Field of Classification Search
None
See application file for complete search history.

(56) References Cited

U.S. PATENT DOCUMENTS

| | | | |
|---|---|---|---|
| 4,899,129 A | 2/1990 | MacFadyen et al. | |
| 5,699,051 A | 12/1997 | Billig et al. | |
| 6,509,658 B1 | 1/2003 | Kim | |
| 7,259,973 B2 * | 8/2007 | Yamashita | 363/21.16 |
| 2007/0279951 A1 | 12/2007 | Wu | |
| 2008/0231121 A1 * | 9/2008 | Yang et al. | 307/131 |
| 2009/0150509 A1 | 6/2009 | Chang et al. | |
| 2009/0256425 A1 | 10/2009 | Lee et al. | |
| 2010/0109619 A1 * | 5/2010 | Tsou et al. | 323/234 |
| 2010/0152916 A1 * | 6/2010 | Bartolome Garcia et al. | 700/296 |
| 2010/0194358 A1 * | 8/2010 | Stanford-Clark | 323/234 |

FOREIGN PATENT DOCUMENTS

| | | |
|---|---|---|
| CN | 2521805 | 11/2002 |
| CN | 2867412 | 2/2007 |
| CN | 2870253 | 2/2007 |
| CN | 201063382 | 5/2008 |

(Continued)

OTHER PUBLICATIONS

Chun-Yu, Chen et al., "Implementing the Design of Smart Home and Achieving Energy Conservation," Industrial Informatics, Jun. 2009, pp. 273-276, IEEE, US.

(Continued)

*Primary Examiner* — Brian Zimmerman
*Assistant Examiner* — Thomas McCormack

(57) ABSTRACT

A method for monitoring and controlling a household appliance is provided. The method has the steps of: monitoring and sampling the power of the household appliance to obtain a first standby power range; monitoring and sampling the power of the household appliance to obtain a set of first real-time power data; calculating a first standby confidence level based on the number of times that the first real-time power data fall within the first standby power range; and determining that the household appliance is in a standby state if the first standby confidence level is greater than or equal to a standby confidence level threshold.

23 Claims, 4 Drawing Sheets

(56) References Cited

FOREIGN PATENT DOCUMENTS

| | | |
|---|---|---|
| CN | 201153295 | 11/2008 |
| CN | 101572368 | 11/2009 |
| CN | 101639675 | 2/2010 |
| CN | 101639693 | 2/2010 |
| GB | 2443454 | 5/2008 |
| TW | 335231 | 6/1998 |
| TW | 346258 | 11/1998 |
| TW | 368204 | 8/1999 |
| TW | 495115 | 7/2002 |
| TW | 566734 | 11/2003 |
| TW | 566734 | 12/2003 |
| TW | 582649 | 1/2004 |
| TW | 582649 | 4/2004 |
| TW | M263665 | 5/2005 |
| TW | M268798 | 6/2005 |
| TW | M284100 | 12/2005 |
| TW | M285825 | 1/2006 |
| TW | M295271 | 8/2006 |
| TW | M298738 | 10/2006 |
| TW | 200720868 | 6/2007 |
| TW | 200814555 | 3/2008 |
| TW | M328025 | 3/2008 |
| TW | 200826383 | 6/2008 |
| TW | 200827613 | 7/2008 |
| TW | M339719 | 9/2008 |
| TW | 200841533 | 10/2008 |
| TW | 200843248 | 11/2008 |
| TW | 200843255 | 11/2008 |
| TW | M346212 | 12/2008 |
| TW | M349138 | 1/2009 |
| TW | 200926535 | 6/2009 |
| TW | M363069 | 8/2009 |
| TW | M364899 | 9/2009 |
| TW | 200941862 | 10/2009 |
| TW | M367493 | 10/2009 |
| TW | 200947194 | 11/2009 |
| TW | 200947197 | 11/2009 |
| TW | 200951703 | 12/2009 |
| TW | M370100 | 12/2009 |
| TW | M372026 | 1/2010 |
| TW | 201005231 | 2/2010 |
| TW | 201006075 | 2/2010 |
| TW | 201009563 | 3/2010 |
| TW | M375231 | 3/2010 |
| TW | M376018 | 3/2010 |
| TW | 201015288 | 4/2010 |
| TW | M379266 | 4/2010 |
| TW | 201019562 | 5/2010 |
| TW | M379790 | 5/2010 |
| TW | M381106 | 5/2010 |
| TW | 201021352 | 6/2010 |
| WO | WO 2008139215 | 11/2008 |
| WO | WO 2009024363 | 2/2009 |

OTHER PUBLICATIONS

Ying-Wen Bai et al., "Design and Implementation of a Socket with Low Standby Power," Consumer Electronics, Aug. 2009, pp. 1558-1565, vol. 55, Issue 3, IEEE, US.

Joon Heo et al., "Design and Implementation of Control Mechanism for Standby Power Reduction," Consumer Electronics, Feb. 2008, pp. 179-185, vol. 54, Issue 1, IEEE, US.

Chun-Yu, Chen et a., "Implementing the Design of Smart Home and Achieving Energy Conservation," Industrial Informatics, Jun. 2009, pp. 273-276, IEEE, US.

Sajal K. Das., "The Role of Prediction Algorithms in the Mavhome Smart Home Architecture," Wireless Communications, Dec. 2002, pp. 2-8, IEEE, US.

* cited by examiner

METHOD AND APPARATUS FOR MONITORING AND CONTROLLING A HOUSEHOLD APPLIANCE STANDBY STATE

CROSS REFERENCE TO RELATED APPLICATIONS

This Non-provisional application claims priority under 35 U.S.C. §119(a) on Patent Application No(s). 99146306, filed in Taiwan, Republic of China on Dec. 28, 2010, the entire contents of which are hereby incorporated by reference.

BACKGROUND OF THE INVENTION

1. Field of the Invention

The present invention relates to energy conservation technology for household appliances, and, more particularly relates to apparatuses and methods for monitoring the power state of household appliances.

2. Description of the Related Art

Generally, household appliances consume power even in a standby state. To meet energy saving requirements, saving power during a standby state has become an important issue for those skilled in the household appliances field.

In the prior art, manual switches or timer switches are used to save power during a standby state. There are some techniques in the prior art which detect the standby state of household appliances, e.g., using a fixed value of current/power, or a specific ratio of a variation of current/power; however, these techniques still lack precision.

Therefore, apparatuses and methods for monitoring and controlling a standby state of various household appliances are needed.

BRIEF SUMMARY OF THE INVENTION

The present invention provides a method for monitoring and controlling a household appliance, comprising the steps of: monitoring and sampling the power of the household appliance to obtain a first standby power range; monitoring and sampling the power of the household appliance to obtain a set of first real-time power data; calculating a first standby confidence level based on the number of times that the first real-time power data fall within the first standby power range; and determining that the household appliance is in a standby state if the first standby confidence level is greater than or equal to a standby confidence level threshold.

The present invention also provides an apparatus for monitoring and controlling a household appliance, comprising: a socket, for electrically coupling the household appliance to a power source; a microcontroller, electrically coupled to the socket, for monitoring and sampling the power of the household appliance to obtain a first standby power range, monitoring and sampling the power of the household appliance to obtain a set of first real-time power data, calculating a first standby confidence level based on the number of times that the first real-time power data fall within the first standby power range, and determining that the household appliance is in a standby state if the first standby confidence level is greater than or equal to a standby confidence level threshold.

DETAILED DESCRIPTION OF THE INVENTION

Method for Monitoring and Controlling a Household Appliance

Figure 1:
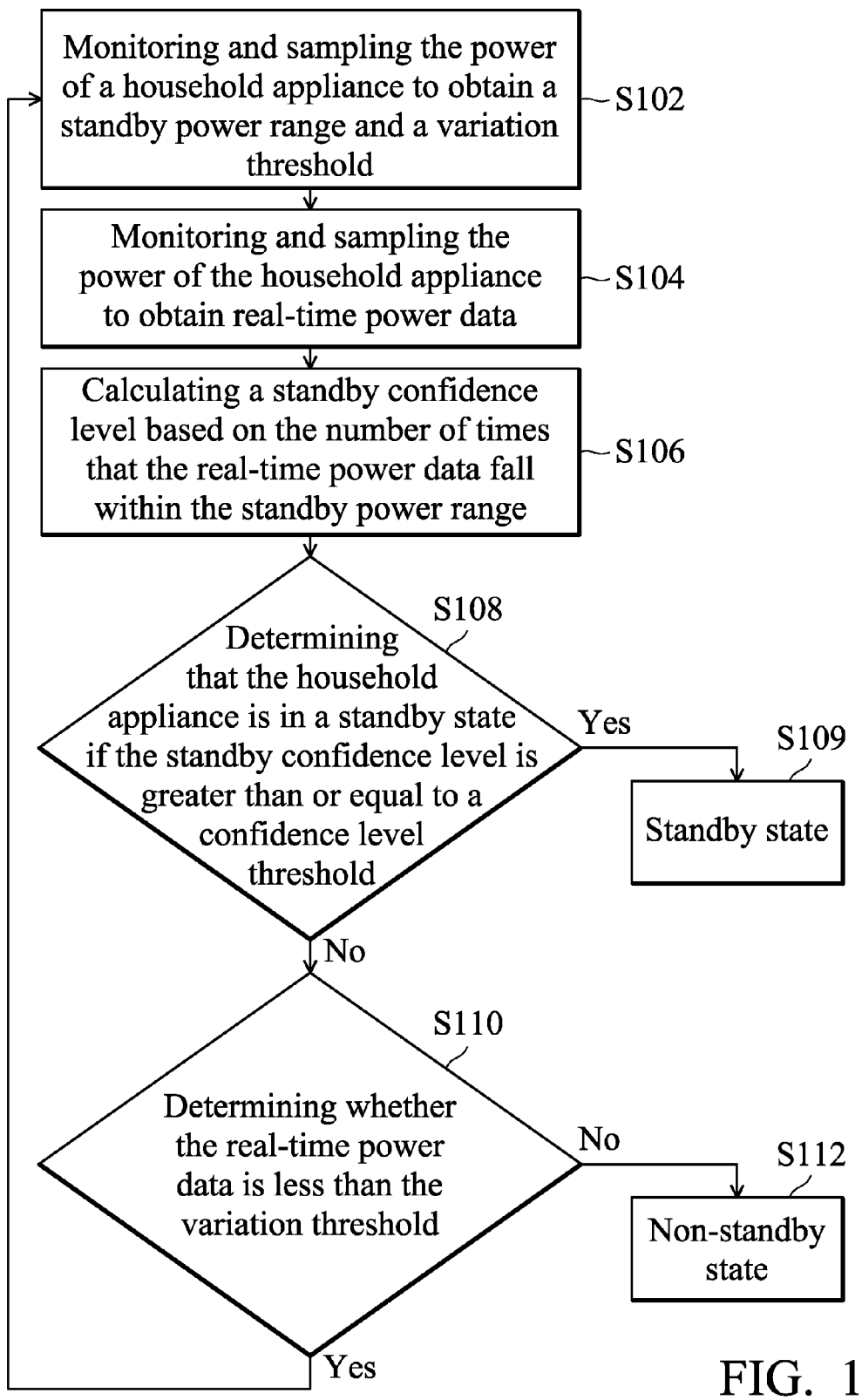
FIG. 1 is a flowchart of a method for monitoring and controlling a household appliance standby state according to an embodiment of the present invention.

FIG. 1 is a flowchart of a method for monitoring and controlling a household appliance standby state according to an embodiment of the present invention. The method of the present invention can be performed by the apparatus of the present invention which will be discussed later. The method of the present invention comprises: in step S102, monitoring and sampling the power of a household appliance to obtain a standby power range and a variation threshold; in step S104, monitoring and sampling the power of the household appliance to obtain a set of real-time power data; in step S106, calculating a standby confidence level based on the number of times that the real-time power data fall within the standby power range; and in step S108~S109, determining that the household appliance is in a standby state if the standby confidence level is greater than or equal to a confidence level threshold.

The method for monitoring and controlling the standby state of the household appliance includes three modes: 1. Training Mode; 2. Detection Mode; and 3. Adaptation Mode, as will be described in the following.

•Training Mode•

In an embodiment, after the coupling the apparatus of the present invention to the household appliance, the Training Mode is initiated. Step S102 is the so-called Training Mode of the present invention, which is performed to obtain the standby power range required in the Detection Mode and the variation threshold required in the Adaptation Mode.

Figure 2:
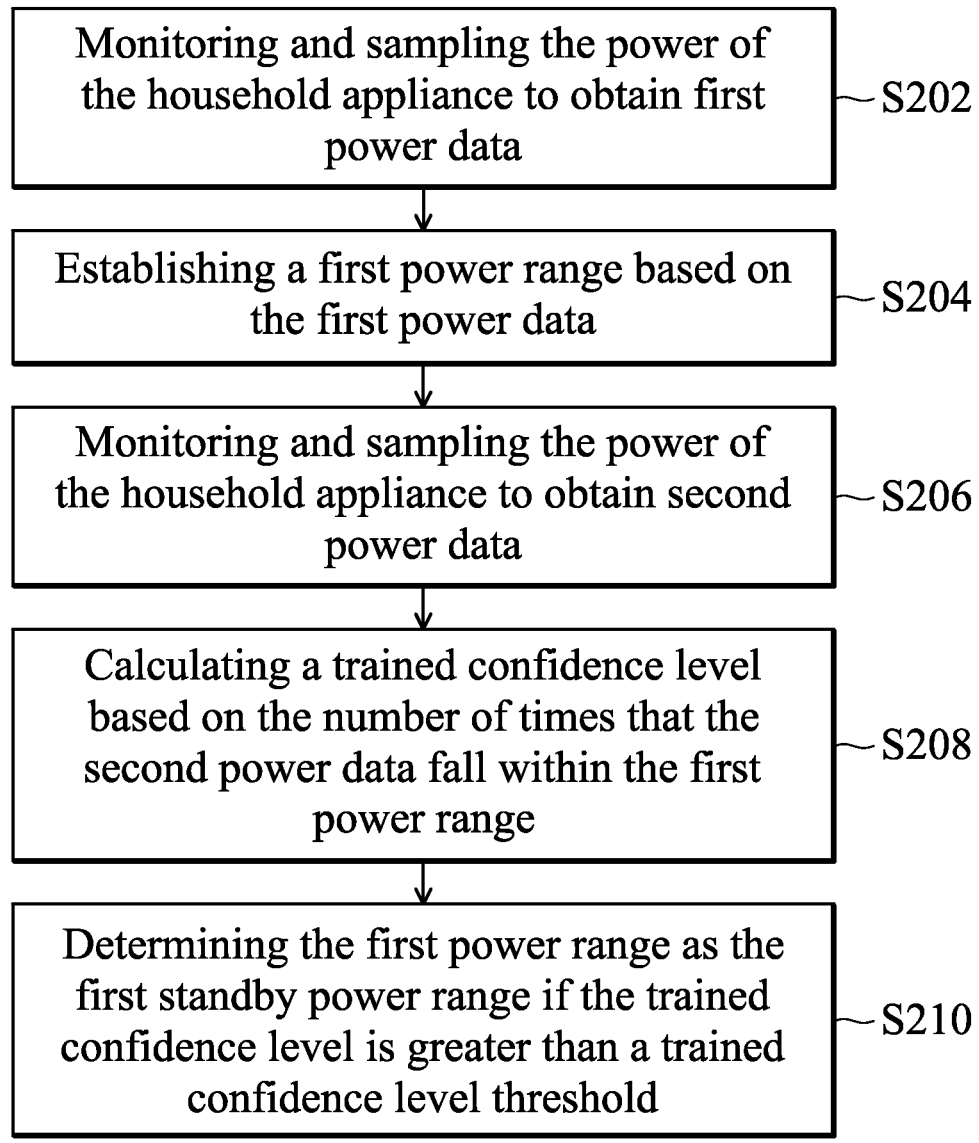
FIG. 2 is a flowchart of the step S102 (Training Mode) for obtaining the standby power range.

FIG. 2 is a flowchart of the step S102 (Training Mode) for obtaining the standby power range. The step S102 (Training Mode) comprises: in step S202, monitoring and sampling the power of the household appliance to obtain a set of first power data; in step S204, establishing a first power range based on the first power data; in step S206, monitoring and sampling the power of the household appliance to obtain a set of second power data; in step S208, calculating a trained confidence level based on the number of times that the second power data fall within the first power range; and in step S210, determining the first power range as the first standby power range if the trained confidence level is greater than or equal to a trained confidence level threshold.

Figure 3:
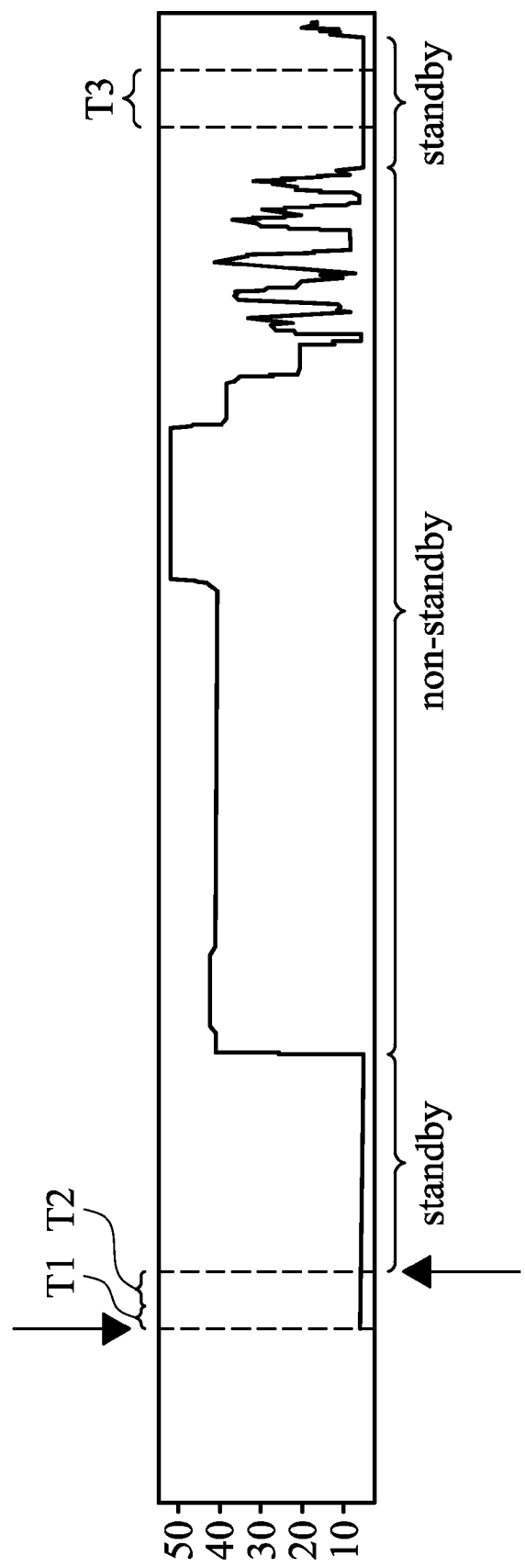
FIG. 3 shows the power consumed by a household appliance in an embodiment.

FIG. 3 shows the power consumed by a household appliance in an embodiment. As shown in FIG. 3, the household appliance is usually in the standby state at the beginning of operation. Therefore, in an embodiment, when detecting a connection between the apparatus of the present invention and the household appliance, the Training Mode is initiated. After monitoring and sampling the power of the household appliance for a period T1, a plurality of first power data, for example, $P_{11}$~$P_{1N}$, is obtained. Step S204 then uses the first power data $P_{11}$~$P_{1N}$ obtained to establish a first power range Smin~Smax of the household appliance. Specifically, the upper limit Smax of the first power range $P_{11}$~$P_{1N}$ is the average $\mu$ of the first power data $P_{11}$~$P_{1N}$ plus the product of a system-determined constant Z and the standard deviation $\sigma$ of the first power data $P_{11}$~$P_{1N}$, and the bottom limit Smin of the first power range $P_{11}\sim P_{1N}$ is the average $\mu$ of the first power data $P_{11}\sim P_{1N}$ minus the product of a system-determined constant $Z$ and the standard deviation $\sigma$ of the first power data $P_{11}\sim P_{1N}$, as follows:

$$Smax\cdot\mu\cdot Z\cdots \quad \text{(Equation 1); and}$$

$$Smin\cdot\mu\cdot Z\cdots \quad \text{(Equation 2),}$$

wherein, the average $\mu$ and the standard deviation $\sigma$ of the first power data $P_{11}\sim P_{1N}$ can be obtained by the following Equations:

$$\cdots \frac{1}{N}\sum_{i=1}^{N} P_{1i}; \quad \text{(Equation 3)}$$

and $$\cdots \sqrt{\frac{1}{N}\cdot\sum_{i=1}^{N}(P_{1i}\cdots)^2}. \quad \text{(Equation 4)}$$

Note that the system-determined constant $Z$ is the $(1-\alpha/2)$-quantile of a unit normal variate, and the $\alpha$ is a significance level, which can be found by using the following Table 1.

TABLE 1

| Confidence Level (%) | $\alpha$ | $\alpha/2$ | $Z_{1-\alpha/2}$ |
|---|---|---|---|
| 20 | 0.8 | 0.4 | 0.253 |
| 40 | 0.6 | 0.3 | 0.524 |
| 60 | 0.4 | 0.2 | 0.842 |
| 68.26 | 0.3174 | 0.1587 | 1.000 |
| 80 | 0.2 | 0.1 | 1.282 |
| 90 | 0.1 | 0.5 | 1.645 |
| 95 | 0.05 | 0.025 | 1.960 |
| 95.46 | 0.0454 | 0.0228 | 2.000 |
| 98 | 0.02 | 0.01 | 2.326 |
| 99 | 0.01 | 0.005 | 2.576 |
| 99.74 | 0.0026 | 0.0013 | 3.000 |
| 99.8 | 0.002 | 0.001 | 3.090 |
| 99.9 | 0.001 | 0.0005 | 3.29 |
| 99.98 | 0.0002 | 0.0001 | 3.72 |

Then, in step S206 of the embodiment (refer to FIG. 3), after monitoring and sampling the power of the household appliance for a period T2, a plurality of second power data, for example, $P_{21}\sim P_{2M}$, is obtained. In step S208, the method calculates a trained confidence level rs based on the number of times that the second power data $P_{21}\sim P_2m$ falls within the first power range Smin~Smax. The trained confidence level rs, for example, is a ratio between the number of times that the second power data $P_{21}\sim P_{2M}$ falls within the first power range Smin~Smax and the number of times the second power data $P_{21}\sim P_{2M}$ was sampled, as follows:

$$rs\cdot M'/M \quad \text{(Equation 5); and}$$

$$M'\cdot\Sigma_{n=1}^{M}g^n, \text{ if } S_{min}\cdot P_{2M}\cdot S_{MAX}, g_n=1; \text{ else } g_n=0 \quad \text{(Equation 6).}$$

In an embodiment, the trained confidence level threshold can be predetermined as 0.95. In step S210, if the trained confidence level calculated in step S208 is greater than or equal to the trained confidence level threshold 0.95, the first power range Smax~Smin can be regarded as the "standby power range" of the household appliance.

Note that, at the same time step S102 is performed, the variation threshold required in the Adaptation Mode can also be obtained. For example, the variation threshold δ can be obtained based on the upper limit of the first power range Smax and the bottom limit of the first power range Smin as follows:

$$\cdots 2Smax\sim Smin \quad \text{(Equation 7)}$$

•Detection Mode•

Step S104~S108 are the so-called Detection Mode of the method of the present invention, and are performed to determine whether the household appliance is in the standby state or in a non-standby state, wherein the non-standby state means that the household appliance is operating or completely turned off.

After the training mode is completed, the Detection Mode is performed to monitor the household appliance. Referring to FIG. 1, step S104 follows step S102. Step 104 and step S106 are relatively similar to step S206 and step S208 in the Training Mode. In step S104, the power of the household appliance is monitored for a period T3 (refer to FIG. 3) to sample a set of real-time power data. In step S106, a standby confidence level can be calculated based on the number of times that the real-time power data fall within the standby power range. Similar to the calculation for the trained confidence level (refer to Equation 5 and Equation 6), the standby confidence level can be the ratio between the number of times that the real-time power data fall within the standby power range and the number of times that the real-time power data is sampled.

In an embodiment, a standby confidence level threshold of 0.95 is predetermined. In step S108, it is determined whether the standby confidence level is greater than or equal to the standby confidence level threshold 0.95. Note that it is not necessary for the standby confidence level threshold to be equal to the trained confidence level threshold, and those people who are skilled in the art can define values of the thresholds according to the present invention. If the determination result in step S108 is "yes" (i.e., the standby confidence level is greater than or equal to the standby confidence level threshold of 0.95), step S109 will be performed. In step S109, it is determined that the household appliance is in the standby state. For the purpose of energy conservation, when the household appliance is determined to be in the standby state, the power of the household appliance should be cut off to prevent the household appliance from consuming power.

It should be noted that the standby power of the household appliance may change due to inner or outer factors. Therefore, the present invention provides an Adaptation Mode to modify the standby power range of the household appliance standby state.

•Adaptation Mode•

Step S110 is the Adaptation Mode of the method of the present invention.

In step S108, if it is determined that the standby confidence level is smaller than the standby confidence level threshold 0.95, step S110 will be performed to determine whether the real-time power data is less than the variation threshold. If the determination result in step S110 is "No" (i.e., the real-time power data is greater than or equal to the variation threshold), it means that the power consuming situation of the household appliance is normal, and the household appliance is determined to be in non-standby state (S112) and is qualified to be provided with power. If the determination result in step S110 is "Yes" (i.e., the real-time power data is less than the variation threshold), it means that the power consuming situation of the household appliance may have probably changed, and the standby power range obtained in the Training Mode is not precise and should be modified. Then, step S102 will be performed to re-obtain a new standby power range of the household appliance.

In summary, in step S102 of the Training Mode of the present invention, the power of the household appliance is monitored and sampled to train a first standby power range and a variation threshold and in step S104 of the Detection Mode, the power of the household appliance is monitored and sampled to obtain a set of first real-time power data, and in step S106 of the Detection Mode, a first standby confidence level is calculated based on the number of times that the first real-time power data fall within the first standby power range. Note that the Training Mode (step S102) and the Detection Mode (steps S104~S108) will be performed again (i.e., monitoring and sampling the power of the household appliance to obtain a second standby power range in step S102, and monitoring and sampling the power of the household appliance to obtain a set of the second real-time power data in step S104, and calculating a second confidence level based on the number of times that the second power data falls within the first power range in step S106) when the first standby confidence level is determined, in step S108 of the Detection Mode, to be less than the standby confidence level threshold and the first real-time power data is determined, in step S110 of the Adaptation Mode, to be less than the variation threshold. In the steps S108~S109, the second standby confidence level is greater than or equal to the standby confidence level threshold, and the household appliance is determined to be in the standby state, and in the steps S108~S110, the second standby confidence level is less than the standby confidence level threshold, wherein it is further determined whether the power consuming situation of the household appliance has changed according to the second real-time power data.

•Restoring Power•

The present invention may cut off the power of the household appliance which is in the standby state. In an embodiment, the present invention may continually detect the behavior of users and turn on the power of the household appliance when determining that a user is about to use the household appliance.

•Apparatus for Monitoring and Controlling a Household Appliance•

Figure 4:
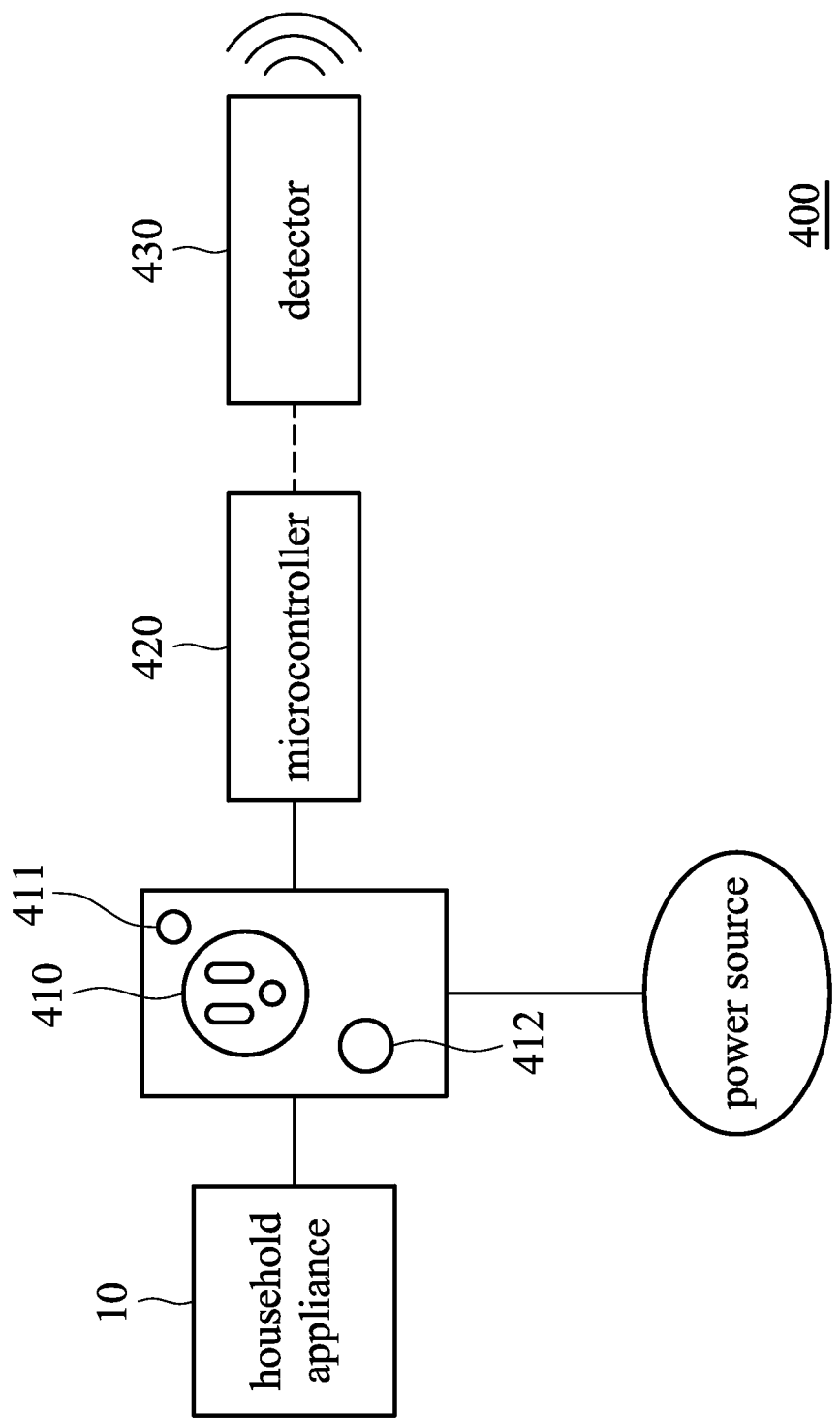
FIG. 4 is a schematic diagram of the apparatus of the present invention.

The method for monitoring and controlling a household appliance has been fully described above. In addition, the present invention further provides an apparatus for performing the method. FIG. 4 is a schematic diagram of the apparatus of the present invention. The apparatus 400, used to monitor and control the power state of the household appliance 10, comprises at least a socket 410 and a microcontroller 420. The socket 410 of the present invention can be disposed on a wall, like a conventional power socket. The socket is used to electrically couple the household appliance to a power source. The microcontroller 420 is electrically coupled to the socket 410 to perform the discussed methods of the present invention. Before entering the Training Mode, the apparatus of the present invention first detects if there is a load on the household appliance. If there is a load, the present invention performs the Training Mode. The microcontroller 420, in the Training Mode, can monitor and sample the power of the household appliance, for example, by an electric meter, to obtain a first standby power range, and in the Detection Mode, monitor and sample the power of the household appliance to obtain a set of first real-time power data, and calculate a first standby confidence level based on the number of times that the first real-time power data falls within the first standby power range, and determine that the household appliance is in a standby state if the first standby confidence level is greater than or equal to a standby confidence level threshold, and cut off the power when the first standby confidence level is determined to be greater than or equal to the standby confidence level threshold. The standby confidence level is ratio between the number of times that the first real-time power data fall within the first standby power range and the number of times that the first real-time power data is sampled (refer to Equation 5~6).

In the Training Mode, the microcontroller 420 may further monitor and sample the power of the household appliance to obtain a set of first power data, establish a first power range based on the first power data, monitor and sample the power of the household appliance to obtain a set of second power data, calculate a trained confidence level based on the number of times that the second power data falls within the first power range, and determine the first power range as the first standby power range if the trained confidence level is greater than or equal to a trained confidence level threshold. The upper limit of the first power range is the average of the first power data plus the product of a system-determined determined constant and the standard deviation of the first power data, and the bottom limit of the first power range is the average of the first power data minus the product of the system-determined constant and the standard deviation of the first power data. The standby power range can be obtained from Equation 1~4, in which, the system-determined constant is the $(1-\alpha/2)$-quantile of a unit normal variate, and the $\alpha$ is a significance level, which equals to 1 minus a system-determined confidence level. For example, when the system-determined confidence level is 95%, a is 0.05. The system-determined constant level can be found from Table 1 listed previously.

The microcontroller 420, in the Training Mode, may additionally obtain a variation threshold. The variation threshold is the upper limit of the first power range multiplied by a specific multiple, for example, 2, and then subtracted by the bottom limit of the first power range, as shown in Equation 7. In the Adaptation Mode, the microcontroller 420 further determines whether the first standby confidence level is greater than or equal to the standby confidence level threshold. When the first real-time power data is smaller than the variation threshold, the apparatus of the present invention monitors and samples the power of the household appliance to obtain a second standby power range, monitors and samples the power of the household appliance to obtain a set of second real-time power data, calculates a second standby confidence level based on the number of times that second real-time power data falls within the second standby power range, and determines that the household appliance is in the standby state if the second standby confidence level is greater than or equal to a standby confidence level threshold. The trained confidence level is the ratio between the number of times that the second real-time power data fall within the first standby power range and the number of times that the second real-time power data is sampled. The trained confidence level can be obtained from the Equation 5~6.

In an embodiment, the apparatus 400 further comprises a detector 430 for turning on the power of the household appliance when detecting that a user is about to use the household appliance. The detector 430 may be an infrared sensor, illumination sensor, acceleration sensor, gravity sensor, gyroscope, pressure sensor, displacement sensor, temperature sensor, or the combination of these sensors. The detector 430 and the microcontroller 420 may connect to each other by wired or wireless means, such as a power line communication (PLC), a Zigbee or RF communication. For example, the detector 430 may be a three-axis gyroscope disposed on a television remote controller. In this example, when a user grabs the controller, the detector 430 detects that the user is about to use the television and sends a signal to the microcontroller 420 to restore the power of the television.

In an embodiment, the apparatus 400 may further comprise an indicator light 411. The indicator light 411 may be disposed on the socket 410 to indicate the operation information of the apparatus 400 of the present invention, such as in the training mode/detection mode/adaptation mode, being power-off, or being compulsorily powered.

In another embodiment, the apparatus 400 may further comprise a compulsory power supply button 412 for the household appliances which should not have power cut off, such as a refrigerator or a security system. The compulsory power supply button 412 may be attached on the socket 410 to be pressed such that the detection for the standby state of the apparatus 400 is ignored and the power source powers to the household appliance.

Those people who are skilled in the art will appreciate that the apparatus 400 of the present invention employs the method of the present invention which was described previously, and thus other embodiments regarding to the apparatus 400 will not be further discussed for brevity.

What is claimed is:

1. A method for monitoring and controlling a household appliance, comprising the steps of:
   monitoring and sampling the power of the household appliance to obtain a first standby power range;
   monitoring and sampling the power of the household appliance to obtain a set of first real-time power data;
   calculating a first standby confidence level based on the number of times that the first real-time power data fall within the first standby power range; and
   determining that the household appliance is in a standby state if the first standby confidence level is greater than or equal to a standby confidence level threshold.

2. The method as claimed in claim 1, wherein the step of monitoring and sampling the power of the household appliance to obtain the first standby power range further comprises:
   monitoring and sampling the power of the household appliance to obtain a set of first power data;
   establishing a first power range based on the first power data;
   monitoring and sampling the power of the household appliance to obtain a set of second power data;
   calculating a trained confidence level based on the number of times that the second power data fall within the first power range;
   determining the first power range as the first standby power range if the trained confidence level is greater than or equal to a trained confidence level threshold.

3. The method as claimed in claim 1, wherein the step of monitoring and sampling the power of the household appliance to obtain the first standby power range further comprises: calculating a variation threshold at the same time.

4. The method as claimed in claim 3, if the first standby confidence level is less than the standby confidence level threshold, and all of the first real-time power data is less than the variation threshold, further comprising:
   monitoring and sampling the power of the household appliance to obtain a second standby power range;
   monitoring and sampling the power of the household appliance to obtain a set of second real-time power data;
   calculating a second standby confidence level based on the number of times that second real-time power data fall within the second standby power range; and
   determining the household appliance is in the standby state if the second standby confidence level is greater than or equal to a standby confidence level threshold.

5. The method as claimed in claim 3, wherein:
   the upper limit of the first power range is the average of the first power data plus the product of a system-determined constant and the standard deviation of the first power data; and
   the bottom limit of the first power range is the average of the first power data minus the product of the system-determined constant and the standard deviation of the first power data; and
   the variation threshold is the upper limit of the first power range multiplied by a specific multiple and then subtracted by the bottom limit of the first power range.

6. The method as claimed in claim 5, wherein the specific multiple is 2.

7. The method as claimed in claim 5, wherein the system-determined constant is the $(1-\alpha/2)$-quantile of a unit normal variate, and the $\alpha$ is a significance level, which equals to 1 minus a system-determined confidence level.

8. The method as claimed in claim 1, wherein the standby confidence level is a ratio between the number of times that the first real-time power data fall within the first standby power range and the number of times that the first real-time power data is sampled.

9. The method as claimed in claim 2, wherein the trained confidence level is the ratio between the number of times that the second power data fall within the first power range and the number of times that the second power data is sampled.

10. The method as claimed in claim 1, further comprises cutting off the power of the household appliance when determining that the household appliance is in the standby state.

11. The method as claimed in claim 1, further comprising: turning on the power of the household appliance when determining that a user is about to use the household appliance.

12. An apparatus for monitoring and controlling a household appliance, comprising:
    a socket, for electrically coupling the household appliance to a power source;
    a microcontroller, electrically coupled to the socket, for monitoring and sampling the power of the household appliance to obtain a first standby power range, monitoring and sampling the power of the household appliance to obtain a set of first real-time power data, calculating a first standby confidence level based on the number of times that the first real-time power data fall within the first standby power range, and determining that the household appliance is in a standby state if the first standby confidence level is greater than or equal to a standby confidence level threshold.

13. The apparatus as claimed in claim 12, wherein the microcontroller further monitors and samples the power of the household appliance to obtain a set of first power data, establishes a first power range based on the first power data, monitors and samples the power of the household appliance to obtain a set of second power data, calculates a trained confidence level based on the number of times that the second power data fall within the first power range, and determines the first power range as the first standby power range if the trained confidence level is greater than or equal to a trained confidence level threshold.

14. The apparatus as claimed in claim 12, wherein the microcontroller further calculates a variation threshold.

15. The apparatus as claimed in claim 14, wherein, if the first standby confidence level is less than the standby confidence level threshold, and all of the first real-time power data is less than the variation threshold, the microcontroller monitors and samples the power of the household appliance to obtain a second standby power range, monitors and samples the power of the household appliance to obtain a set of second real-time power data, calculates a second standby confidence level based on the number of times that second real-time power data fall within the second standby power range, and determines that the household appliance is in the standby state if the second standby confidence level is greater than or equal to a standby confidence level threshold.

16. The apparatus as claimed in claim 13, wherein:
the upper limit of the first power range is the average of the first power data plus the product of a system-determined constant and the standard deviation of the first power data;
the bottom limit of the first power range is the average of the first power data minus the product of the system-determined constant and the standard deviation of the first power data; and
the variation threshold is the upper limit of the first power range multiplied by a specific multiple and then subtracted by the bottom limit of the first power range.

17. The method as claimed in claim 16, wherein the specific multiple is 2.

18. The apparatus as claimed in claim 16, wherein the system-determined constant is the $(1-\alpha/2)$-quantile of a unit normal variate, and the $\alpha$ is a significance level, which equals to 1 minus a system-determined confidence level.

19. The apparatus as claimed in claim 12, wherein the standby confidence level is a ratio between the number of times that the first real-time power data falls within the first standby power range and the number of times that the first real-time power data is sampled.

20. The apparatus as claimed in claim 13, wherein the trained confidence level is the ratio between the number of times that the second power data fall within the first power range and the number of times that the second power data is sampled.

21. The apparatus as claimed in claim 12, further comprising:
a detector, for turning on the power of the household appliance when detecting that a user is about to use the household appliance.

22. The apparatus as claimed in claim 12, further comprising:
a indicator light, attached on the socket, for indicating to a user, the state of the system.

23. The apparatus as claimed in claim 12, further comprising:
a compulsory power supply button, attached on the socket, for pressing, such that the power source powers the household appliance.

* * * * *